(12) United States Patent
Lechat et al.

(10) Patent No.: US 7,906,583 B2
(45) Date of Patent: Mar. 15, 2011

(54) RADIAL BLOCK COPOLYMERS AND ADHESIVES BASED THEREON WITH IMPROVED DIE-CUTTING PERFORMANCE

(75) Inventors: Jacques Bernard Lechat, Braine l'Alleud (BE); Michael Oliver Myers, Baton Rouge, LA (US); Marie-Noelle Cazenave, Pau (FR); Christophe Derail, Serres Sainte Marie (FR); Nicolas Kappes, Brussels (BE); Jurgen Schroeyers, Helchteren (BE)

(73) Assignees: The Dow Chemical Company, Midland, MI (US); Exxon Mobil Chemical Patents Inc., Houston, TX (US)

( * ) Notice: Subject to any disclaimer, the term of this patent is extended or adjusted under 35 U.S.C. 154(b) by 508 days.

(21) Appl. No.: 11/932,360

(22) Filed: Oct. 31, 2007

(65) Prior Publication Data
US 2009/0133834 A1    May 28, 2009

Related U.S. Application Data

(63) Continuation of application No. 10/490,973, filed on Sep. 13, 2004, now abandoned.

(51) Int. Cl.
*B32B 37/12* (2006.01)
*C08L 53/02* (2006.01)
*C09J 153/02* (2006.01)

(52) U.S. Cl. ......................................... 525/89
(58) Field of Classification Search ............ 525/89
See application file for complete search history.

(56) References Cited

U.S. PATENT DOCUMENTS

| | | | |
|---|---|---|---|
| 3,932,327 A | 1/1976 | Naylor | |
| 4,104,326 A | 8/1978 | Fodor | |
| 4,328,090 A | 5/1982 | Stuckey, Jr. et al. | |
| 4,500,424 A | 2/1985 | Simpson et al. | |
| 4,629,766 A | 12/1986 | Malatesta et al. | |
| 4,686,030 A | 8/1987 | Ward | |
| 4,846,961 A | 7/1989 | Robinson et al. | |
| 4,849,093 A | 7/1989 | Vauk et al. | |
| 5,057,571 A | 10/1991 | Malcolm | |
| 5,171,793 A | 12/1992 | Johnson et al. | |
| 5,194,500 A | 3/1993 | Chin et al. | |
| 5,292,819 A | 3/1994 | Diehl et al. | |
| 5,399,627 A | 3/1995 | Diehl et al. | |
| 5,412,032 A | 5/1995 | Hansen et al. | |
| 5,502,104 A | 3/1996 | Hohner et al. | |
| 5,532,319 A | 7/1996 | Asahara et al. | |
| 5,663,228 A | 9/1997 | Sasaki et al. | |
| 5,750,607 A | 5/1998 | Gerard et al. | |
| 5,820,749 A | 10/1998 | Haluska et al. | |
| 5,932,648 A | 8/1999 | Troska et al. | |
| 5,948,527 A | 9/1999 | Gerard et al. | |
| 6,291,583 B1 | 9/2001 | Komatsuzaki et al. | |
| 6,399,627 B1 | 6/2002 | Song et al. | |

FOREIGN PATENT DOCUMENTS

| | | |
|---|---|---|
| EP | 0757066 A1 | 2/1997 |
| EP | 0798358 A1 | 10/1997 |
| EP | 1103577 A1 | 5/2001 |
| WO | WO 92/20725 A1 | 11/1992 |
| WO | WO 95/12623 A1 | 5/1995 |
| WO | WO 95/14727 A1 | 6/1995 |

OTHER PUBLICATIONS

International Search Report for PCT/EP02/10517, 4 pages (Feb. 2003).
Y. Iyengar, Adhesion Behavior of Nylon Tire Cord/Adhesive/Rubber Systems, Journal of Applied Polymer Science, 13, 353-363 (1969).

*Primary Examiner* — Jeffrey C Mullis
(74) *Attorney, Agent, or Firm* — Akin Gump Strauss Hauer & Feld LLP; Gregory M. Hasley; Sarah J. Ring (57) ABSTRACT

Improved adhesives are provided through the use of styrenic radial block copolymers, containing at least 40 wt % diblock copolymers, the adhesives have improved adhesive properties and a reduced elastic behavior under die-cutting conditions. Compared to conventional linear block copolymers of similar molecular weight, radial copolymers offer higher holding power and lower melt viscosity for the adhesive. They therefore contribute to an improved balance between processability and end-use properties.

30 Claims, 5 Drawing Sheets

RADIAL BLOCK COPOLYMERS AND ADHESIVES BASED THEREON WITH IMPROVED DIE-CUTTING PERFORMANCE

CROSS REFERENCE TO RELATED APPLICATIONS

This application is a continuation of U.S. patent application Ser. No. 10/490,973 filed Sep. 13, 2004.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING

Not applicable.

FIELD OF THE INVENTION

The present invention is directed to radial block copolymer compositions and pressure-sensitive adhesive compositions based thereon. The pressure-sensitive adhesives are particularly useful in label and tape manufacture.

BACKGROUND OF THE INVENTION

Figure 1:
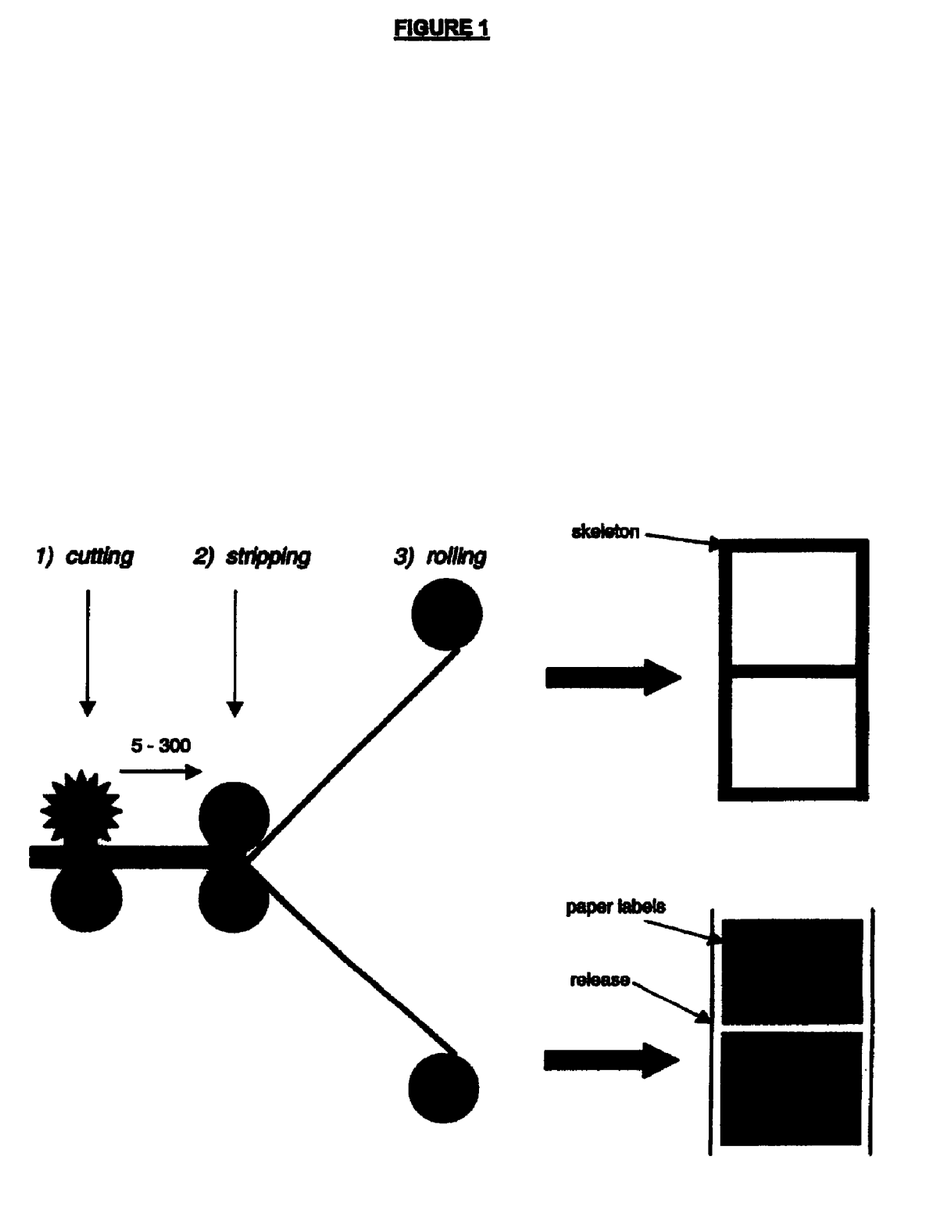
FIG. 1 illustrates a typical die-cutting process.

Radial block copolymers are known and it is also known that during their manufacture up to 20 wt % of the diblock copolymers remain unreacted and are present as diblock copolymer material. These low diblock content radial copolymers have been proposed as components in pressure-sensitive adhesives, where they are used to make during label manufacture, a laminate of a face stock, pressure-sensitive adhesive layer, and a release liner, such as silicone-coated paper, which is passed through an apparatus that converts the laminate into commercially useful labels and label stock. The converting operation processes involve printing, die-cutting, and matrix stripping to leave labels on a release liner, marginal hole punching, perforating, fan folding, guillotining and the like. It is important that the cutting action breaks the face stock and adhesive layer, but does not indent the release liner. Producing a series of labels on a backing sheet involves cutting around the label and removing the material between two labels (the matrix) while leaving the label itself attached to the backing sheet. It is important that the die-cutting machine make a clean break at operating speeds. The adhesive with the copolymer of low diblock content is formulated to have the desired viscoelastic and adhesive properties so that it can be applied to the release liner or the face-stock back, and will remain on the label after stripping and will have the required adhesion. But these are properties that make the adhesive film difficult to cut or break. These properties make die-cutting difficult and inconsistent, causing the adhesive lends to form adhesive strings and deposits on the cutting blade. FIG. 1 illustrates a typical die-cutting process.

Die-cutting involves cutting the laminate through to the release liner face. Other procedures involve cutting completely through the label laminate and include hole punching, perforating, and guillotining, particularly on flat sheets.

The cost of converting a laminate into a finished product, such as a label, is a function of the various processing operations' rates. Line speed depends on whether a printing step is involved. If there is no printing as with, for example, computer labels, speeds can reach 300 meters/minute. If label printing is involved, then speeds of 50-100 meters/minute are typical. While the nature of all laminate layers impact convertibility cost, the adhesive layer can limit convertibility ease. The adhesive layer's viscoelastic nature causes this limitation—in particular its high elasticity prevents it from flowing away from the cut line during die-cutting and also promotes its transfer to cutting blades during cutting. High adhesive elasticity also causes adhesive stringiness, which hinders matrix stripping as the unwanted facing material is removed after die-cutting. High elasticity also promotes adhesive layer reconnection after the layer is severed.

Achieving good convertibility does not necessarily coincide with achieving excellent adhesive performance. Adhesives must be formulated to fit needs, and important properties include peel adhesion, tack, shear, and viscosity at various temperatures and adhesion on various substrates such as polymers, papers, glasses, and steels. Good, general-purpose adhesives may exhibit poor convertibility simply because the adhesive is difficult to cleanly sever. The adhesive may stick to a die or blade. As previously discussed in label manufacture, die-cutting and matrix stripping operations occur at speeds from 5-300 meters per minute, typically 50-100 meters per minute, if printing is involved. Within a range of speeds, use of a particular adhesive may result in breaking the matrix despite the fact that successful matrix stripping can occur at speeds on either side of the breaking speed. One goal is to provide adhesive systems where the adhesive has good die-cutting performance and where the matrix can be successfully stripped over the entire operating speed range.

Typical label adhesives are produced from acrylic polymer emulsions, which may be tackified by hydrocarbon or natural-resin tackifiers. While these have good die-cutting performance, they require handling large volumes of liquid and subsequent liquid removal. Accordingly, adhesives applied as hot melts would be preferred. At low temperature, acrylic-based adhesives perform poorer than hot-melt systems. Moreover, hot melts can be used at faster line application speeds in a broader temperature range, have more aggressive tack, and can be used under humid conditions. It is however important that the adhesive has desired theological properties both for processability such as coating and at end use temperature.

Hot-melt pressure-sensitive adhesive systems are well known and consist of tackified thermoplastic elastomers such as styrenic block copolymers together with tackifying resin (s) and generally some plasticizing oil, an antioxidant and optionally fillers. Styrenic block copolymers containing polystyrene and polybutadiene blocks and/or polyisoprene blocks are particularly useful. These materials are generally available as pure triblocks, (sometimes referred to as SIS and SBS copolymers), and diblocks (sometimes referred to as SI and SB copolymers). The materials are also available as mixtures of diblock and triblock materials (sometimes referred to as SIS+SI and SIS+SB). Examples of these materials are the Vector materials marketed by Dexco and the Kraton D materials marketed by Kraton Polymers. Radial block copolymers have also been proposed.

It is known to use diblock/triblock blends as the elastomeric component in hot-melt pressure-sensitive adhesives. It is further known that adhesive properties and viscosity can be controlled by varying the diblock-to-triblock ratio, varying the styrene content, varying the polymer molecular weight, and varying the block molecular weights within the polymers. The melt viscosity can also be controlled by the addition of plasticizing oils and varying the molecular weight of the polymers. Examples of materials that have been used are Kraton D 1113, containing 16% styrene and 56% diblock; Quintac 3433, marketed by Nippon Zeon, containing 55% diblock and 17% styrene; Vector 4114, containing 42% diblock and 17% styrene; and Vector 4113 containing 20% diblock and 17% styrene. Vector 4114 and Vector 4113 are Dexco products. While these materials have good adhesive properties when tackified and can be used in hot melts for label production, they do not have optimum die-cutting properties. Furthermore, their balance of adhesive properties is not optimum.

U.S. Pat. No. 5,663,228 concerns improving label adhesive die-cuttability. But the proposed solution is different and more complicated than the present invention and requires the use of two particular block copolymer resins having certain glass-transition temperatures and the choice of a tackifying resin that, when mixed with the two particular block copolymers, increases the difference between the two block copolymers' glass transition temperatures. U.S. Pat. No. 5,663,228 also does not appreciate the importance of the adhesive's elastomeric behavior under die-cutting conditions. Examples of styrenic copolymers that are used in the adhesive mixtures of U.S. Pat. No. 5,663,228 are Finaprene 1205 available from AtoFina and Kraton 1107 available from Kraton Polymers.

U.S. Pat. No. 5,412,032 concerns linear SIS triblock/diblock copolymers that can be used in labels to improve die-cutting. This is accomplished using block copolymers with a styrene content from 18 to 24 wt %, a polystyrene block molecular weight from 25,000 to 35,000 an overall molecular weight of above 280,000 up to 520,000 and a coupling efficiency of 20% to 40%. The coupling efficiency corresponds to the percentage of triblock material in the overall block copolymer.

PCT Patent applications PCT/US01/20671 and PCT/US01/20609 describe the use of certain diblock/triblock blends and the use of tetrablock and pentablock copolymers in label adhesives to improve die-cutting performance.

It is also known to use radial block copolymers in hot melt adhesives. For example, U.S. Pat. Nos. 5,194,500 and 5,750,607 relate to styrene-isoprene three-arm block copolymers and their use in adhesives. These three-arm radial copolymers are available as Kraton 1124 from Kraton Polymers and Quintac 3450 and Quintac 3460C from Nippon Zeon. International Patent Publications WO 92/20725 and WO 95/14727 are concerned with radial block copolymers comprising polystyrene block segments and diene block segments, the diene block segment is preferably predominately polyisoprene block containing a small amount of butadiene at the end of the diene block to ensure multi arm coupling. These publications also disclose the use of these polymers in hot melt adhesive systems. WO 92/20725 is primarily concerned with the use of such polymers in adhesives used in disposable articles. WO 95/14727 is concerned with achieving optimum balance between high holding power and low melt viscosity of the adhesives.

European Patent Application 0798358 A1 is concerned with hot melt adhesives, particularly hot melt adhesives for labeling which have a reduced viscosity. The adhesives have a low diblock content and we have found that this results in an adhesive that is too cohesive and has high elasticity which is detrimental for die cuttability as is shown in Comparative Example 1 which is based on the radial polymer DPX-551 mentioned in European Patent Application 0798358 A1 as a suitable polymer for use in its adhesive formulations.

The radial block copolymers of WO 95/14727 are characterised by the formula:

$$(pS\text{-}pI\text{-}pB)_n X \qquad (1)$$

wherein pS is polystyrene, pJ is polyisoprene, pB is polybutadiene, X is a residue of a multifunctional coupling agent used in the production of the radial block copolymer, and n is a number greater than or equal to 3 and representative of the number of branches appended to X. According to WO 95/14727 the number n is predominately 4. The molecular weight of the pS block of the radial block copolymer is between about 10,000 to about 15,000 g/mole, preferably from about 12,000 to about 14,000 g/mole. The pJ-pB block preferably has a total average number molecular weight (polystyrene equivalent molecular weight) ranging from about 40,000 to about 130,000 g/mole, preferably from about 50,000 to about 115,000 g/mole. The overall number average molecular weight (polystyrene equivalent) of the radial block copolymer ranges from about 200,000 to about 400,000 g/mole, preferably from about 225,000 to about 360,000 g/mole, and the polystyrene block pS component is present in an amount of at least about 14 to about 24 parts, preferably from about 15 to about 22 parts, per 100 parts by weight of the radial block copolymer.

The radial block copolymers of WO 95/14727 are thus constituted of polystyrene block segments and polydiene block segments in accordance with formula (1). The copolymers may be random, tapered, block or a combination of these, provided that the polybutadiene segment acts as the terminus segment of the polydiene block so that it may react with the coupling agent. The other end block of the polymer is polystyrene.

The pS segment is generally prepared by sequentially polymerizing styrene. In accordance with formula (1), isoprene is employed to make the pJ segments, the (pS-pJ) polymer chains being formed by sequential polymerization of isoprene with the pS. The pS-pJ-pB-Li polymer chains are then formed by the sequential polymerization of living pS-pI-Li polymer chains with butadiene.

The radial or multiblock $(pS\text{-}pI\text{-}pB)_n X$ copolymers are correspondingly made by coupling the pS-pJ-pB-Li living polymer chains with a multi- or tetra-functional coupling agent, such as $SiCl_4$. Thus, the styrene is polymerized to form pS, the isoprene is then introduced to form pS-pI, the butadiene is then introduced to form pS-pI-pB, and the pS-pJ-pB chains are then coupled with the tetrafunctional coupling agent to form the $(pS\text{-}pI\text{-}pB)_n X$ radial or multiblock polymer. The polymer is generally recovered as a solid such as a crumb, powder or pellet.

In the pJ-pB segment of the $(pS\text{-}pI\text{-}pB)_n X$ polymer, the polyisoprene is present in an amount sufficient to impart predominantly polyisoprene characteristics, not butadiene or polybutadiene characteristics, to the polymer. Thus, in the pI-pB segments of the polymer, the weight amount of polyisoprene will exceed 50% of the total weight of diene in the polymer, i.e., pI/(pI+pB)>50 wt %. Conversely, the weight amount of butadiene or polybutadiene will be less than 50% of the total weight of diene in the polymer, i.e., pB/(pI+pB) <50 wt %. Preferably, the polybutadiene portion of the diene segment is less than 10%, most preferably less than 5%, based on the total weight of the (pI+pB), or diene component of the polymer.

The small amount of butadiene at the end of the diene midblock is useful in that it enhances the coupling reaction in formation of the radial polymer, and results in a radial polymer with a higher number of branches.

The radial polymers of WO 95/14727 are thus synthesized by first contacting styrene with an initiator, suitably, for example, a sec-butyllithium initiator, in the presence of an inert diluent, for example, cyclohexane. A living polymer is then formed, as represented, for example, by the simplified structure pS-Li. The living polystyrene polymer pS-Li is next reacted with an isoprene monomer; the resulting product being represented by the simplified structure pS-pI-Li. The living polymer pS-pJ-Li is then reacted with a small amount of butadiene monomer to produce a living polymer with the structure pS-pI-pB-Li, pB represents butadiene or polybutadiene. Coupling of the pS-pJ-pB-Li with the coupling agent produces a branched block copolymer with the structure (pS-pI-pB)$_n$X. The radial polymer that is produced, using SiCl$_4$ as a coupling agent, will render (pS-pI-pB)$_n$X polymer where n is predominantly 4, i.e. more than 50 wt % of the radial copolymer is four-arm. The butadiene need be added only in an amount necessary to assure that the ends of all of the pI segments of the polymer chains are provided with at least one molecule of butadiene, though as suggested the butadiene can be added in larger or smaller amounts.

Coupling agents which may be used to produce the radial polymers of WO95/14727 include those possessing four sites reactive toward carbon-lithium bonds. Suitable coupling agents are those compositions of the formula X(L)$_n$ where X represents the coupling moiety residue, and L is suitable leaving group. Exemplary of coupling agents of this type are silicon halides, for example, SiCl$_4$, or a silane compound where one or more of the halides is substituted by an alkoxy group, for example, tetramethoxysilane or tetraethoxysilane compounds, epoxy compounds, for example, epoxidised linseed oil, epoxidised soybean oil; acrylate multi esters, for example, pentaerythritol tetraacrylate; epoxy silanes, divinyl compounds, for example, divinyl benzene, and the like.

In addition to polystyrene, other alkenyl aromatic hydrocarbon monomers, such as alkyl-substituted styrenes, alkoxy-substituted styrenes, 2-vinyl pyridine, 4-vinyl pyridine, vinyl naphthalene, alkyl-substituted vinyl naphthalenes and the like. For simplicity herein, the terms styrene, styrenic, polystyrene content- and polystyrene equivalent molecular weight as used in this application are intended to include these other alkenyl aromatic hydrocarbons.

The isoprene polymerization technique is preferably such that the stereochemistry of the polymerisable monomer is adjusted so that predominantly cis-1,4-polyisoprene having a glass transition temperature of less than −50° C. as measured by differential scanning calorimetry at a 10° C. per minute temperature scan rate is produced.

The radial block copolymers are preferably produced by solution anionic techniques, although they could be prepared using bulk, solution or emulsion techniques. Such techniques entail contacting the monomers to be polymerized simultaneously or sequentially with an organoalkali metal compound in a suitable solvent at a temperature within the range from about −100° C. to about 150° C., preferably at a temperature within the range from about 0° C. to about 100° C. Particularly effective anionic polymerization initiators are organolithium compounds having the general formula:

RLi$_n$ wherein:
R is an aliphatic, cycloaliphatic, aromatic or alkyl-substituted aromatic hydrocarbon radical having from 1 to about 20 carbon atoms; and n is an integer of 1 to 3.

In general, any of the solvents known to be useful in the preparation of such polymers may be used. Suitable solvents include straight- and branched chain hydrocarbons such as pentane, hexane, heptane, octane and the like, as well as alkyl-substituted derivatives thereof, cycloaliphatic hydrocarbons such as cyclopentane, cyclohexane, cycloheptane and the like, as well as alkyl-substituted derivatives thereof, aromatic and alkyl-substituted aromatic hydrocarbons such as benzene, toluene, xylene and the like; hydrogenated aromatic hydrocarbons, such as tetralin, decalin and the like. Linear and cyclic ethers such as dimethyl ether, methyl ethyl ether, anisole, tetrahydrofuran and the like may be used in small amounts.

During the coupling reaction involved in producing radial block copolymers not all the polymer will be coupled. The coupling efficiency of radial block copolymers is defined as the mass of coupled polymer divided by the mass of coupled polymer plus the mass of uncoupled polymer. The coupling efficiency herein refers to that of the original polymer not including any degradation fragments formed during processing. Thus, when producing the (pS-pI-pB)$_n$X branched polymers, the coupling efficiency is shown as a percentage by the following relationship:

$$\frac{\text{mass of coupled polymer}}{\text{mass of (uncoupled + coupled) polymer}} \times 100\ (\%)$$

Coupling efficiency can be measured by an analytical method such as gel permeation chromatography.

Coupling efficiency can be controlled by a number of methods. One method to reduce coupling efficiency is to add less than the stoichiometric amount of coupling agent required for complete coupling of the polymers. Another means of reducing coupling efficiency is by the premature addition of a terminator compound. These terminators, such as water or alcohol, react very quickly and can easily be employed to cut short complete coupling of the polymers. In addition, by performing the coupling reaction at elevated temperatures, such as above about 90° C., thermal termination of many of the living polymer groups (pS-pI-Li) occurs prior to coupling. The typical coupling conditions include a temperature of between about 65° C. to about 75° C. and sufficient pressure to maintain the reactants in a liquid phase.

Following the coupling reaction or when the desired coupling efficiency has been obtained, any remaining uncoupled product is terminated such as by the addition of terminators, for example, water, alcohol or other reagents, for the purpose of removing the lithium radical forming the nucleus for the condensed polymer product. The product is then recovered such as by coagulation utilizing hot water or steam or both, or alternatively by the use of a devolatilizing extruder.

Radial four arms block copolymers and their use in hot melt adhesives are also described in European Patent Application 1103577 A1 and U.S. Pat. No. 5,292,819.

The three and four arms products of these patents and the commercially available materials suffer from the disadvantages that they do not have optimum rheological properties for use in permanent label adhesives. We have found that they have a coupling efficiency greater than 60%, generally greater than 70% and accordingly contain less than 40 wt % of diblock copolymer. These polymers tend to have too high a tensile strength and are harder and too cohesive to be useful in adhesive formulations and in other applications such as sound deadening, shock absorption and polymer modification.

We have now developed radial block copolymer compositions which overcome these problems.

We have found that, unlike the known products, if the diblock copolymer content of a mixture of a radial styrenic block copolymer and a styrenic diblock copolymer is above 40 wt % of the total block copolymer content, an adhesive system having improved theological and improved die-cutting performance with desirable adhesive properties may be obtained. Some or all of the diblock may be produced during the manufacture of the radial copolymer.

Surprisingly, we found that die-cutting takes place at relatively low deformation rates and involves pushing the adhesive to the side of the line of cut rather than involving a sharp cutting action. In successful die-cutting, the adhesive must creep when subjected to cutting knife action, flow away from the cut point, and not reform over the cut line.

The creep of the adhesive may be illustrated by assuming typical conditions of die-cutting operations, i.e. a machine line speed of 100 m/min, a rotating cylinder of 10 cm diameter, and face paper and adhesive layers with a thickness of 80 and 20 microns, respectively. Since the diameter of the rotating cylinder is much larger (by a factor 100) than the overall thickness to indent, the effective vertical motion is only 10 cm/s when the knife starts to indent the face paper, and only 2 cm/s when the adhesive itself is indented.

The second aspect has been discovered with the help of finite-element simulations of the die-cutting process performed with Abacus Software. These showed that the adhesive is pushed away by the much stiffer face paper, well before the cutting knife starts to indent the adhesive layer. In other words, the adhesive layer flows under the pressure imparted by the cutting knife on the face stock, which covers the adhesive layer. In most instances, no direct contact between the knife and the adhesive layer occurs.

Figure 2:
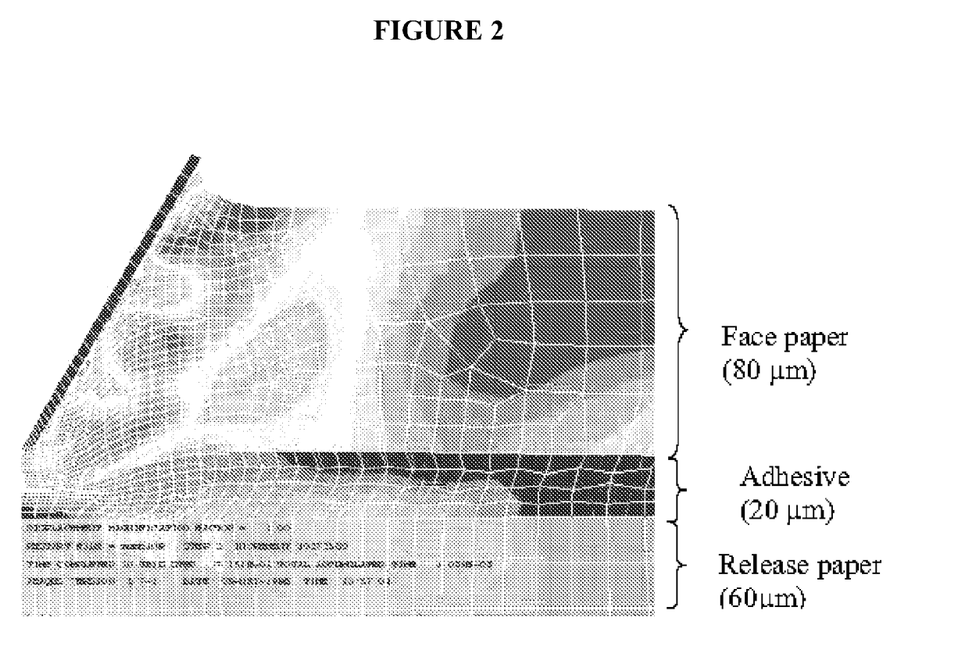
FIG. 2 shows a simulation of the die-cutting.

FIG. 2, is an illustration of a die-cut label during the die cutting process, in which 1 is the release paper, 2 the adhesive layer, 3 is the frontal paper and 4 is the die-cutting blade which is moving in an anticlockwise direction to make the cut. The simulation illustration shows how as the knife crushes and breaks through the paper, the adhesive layer is pushed away under the paper from the line of cut, but that the knife itself does not cut through the adhesive layer. Accordingly, the more readily the adhesives flow and the less elastic they are, the easier and cleaner the cut will be.

Altogether, both the surprisingly low deformations rates involved in the die-cutting process, as well as the need for the adhesive layer to undergo permanent flow during die-cutting operations explains why water-based acrylic adhesives behave better than their triblock (for example, SBS or SIS) counterparts. These two systems provide good examples of good and bad die-cutting behavior respectively.

Viscoelastic behavior of hot-melt adhesives at a given temperature is conveniently captured by the two dynamic moduli known as G' and G", the loss modulus G" giving an indication of the viscous behavior, and the storage modulus G' giving an indication of the elastic behavior. The ratio of G" and G' is known as the loss factor Tangent delta (Tan δ).

The finding that the cutting mechanism pushes the adhesive away from the line of cut rather than performing a sharp cut, leads to the conclusion that the adhesive should be less elastic to enable it to permanently flow away from the line of cut at the cutting temperature, normally room temperature. Emphasis should be put on the low frequency behavior because of the surprisingly small values for the vertical velocity of the knife during die-cutting operations.

Figure 3:
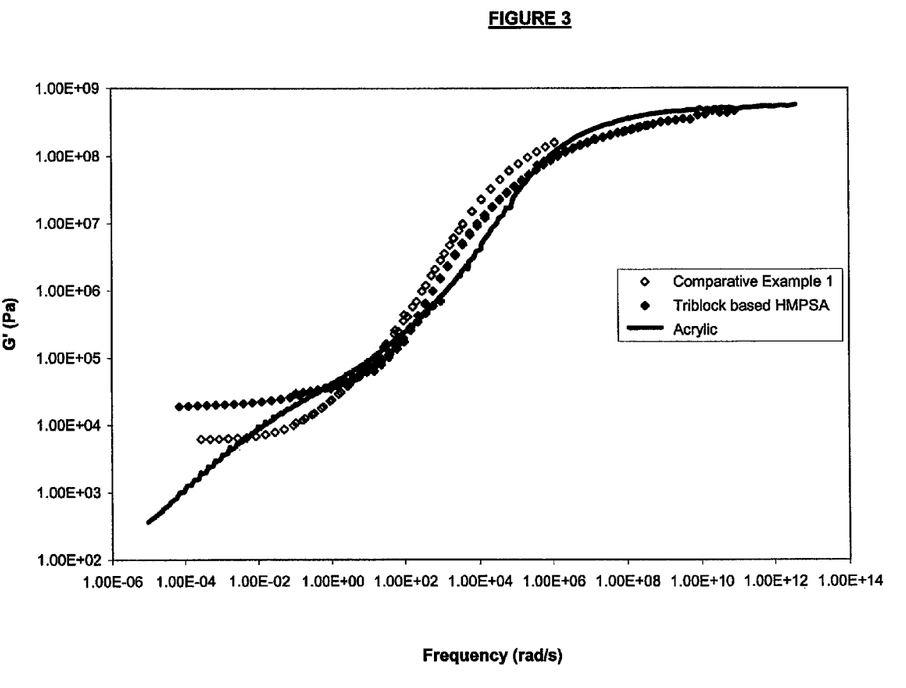
FIG. 3 compares G' of comparative Example 1, a standard hot melt pressure sensitive based on pure triblock copolymer and an acrylic based adhesive.

Dynamic mechanical analysis of acrylics systems shows indeed that the storage modulus G' continuously decreases with frequency, with no indication of a constant plateau at low frequencies. At the same time, there is a relatively high loss modulus G" at low frequency, essentially overlaying with G'. This amplifies the tendency of the adhesive to undergo permanent deformation and flow under stress, as shown in FIG. 3. On the other hand, similar analysis of previous pure triblock copolymer based adhesives shows a constant and relatively high plateau modulus G' (>10,000 Pa) in the low frequency region, much higher than the loss modulus G", reflecting the tendency for the adhesive to recover from deformation, which is undesirable for die-cutting.

We have found that there is also a marginal difference at high frequency, between the behavior of acrylics and the systems of the present invention (glass transition region and glassy domain), especially in the glass transition location on the frequency axis. The theological behavior at these frequencies can be modified by changing the tackifier package, which is known to minimally influence die-cutting behavior.

Accordingly, we have found that, to have good die-cutting performance, an adhesive based on radial copolymers should fulfill the following criteria:

G' at room temperature should decrease monotonically with frequency, at frequencies below the glass transition region (typically <10 rad/s), down to a constant storage modulus plateau at the lowest frequencies. The elastic modulus plateau should be lower than 8,000 Pa, preferably lower than 6,000 Pa, more preferably lower than 5,000 Pa, most preferably lower than 4,000 Pa, when measured at 20° C.

G' should intersect a value of 10,000 Pa at a frequency that is preferably higher than 0.001 rad/s; preferably higher than 0.01 rad/s more preferably higher than 0.05 rad/s; most preferably higher than 0.1 rad/s, when measured at 20° C.

The loss factor Tan δ defined as the ratio G"/G' preferably comprises between 0.2 and 1.3, more preferably between 0.2 and 1.0, more preferably 0.3 to 1.0, more preferably 0.4 to 1.0, most preferably 0.6 to 1.0, at the frequency at which the storage modulus intersects a value of 10,000 Pa, when measured at 20° C.

We have found that, in addition to the improved adhesion performances, desirable die-cuttability properties may be achieved using an adhesive system containing a styrenic block copolymer which contains a radial block copolymer and at least 40 wt % of a diblock styrenic copolymer.

BRIEF SUMMARY OF THE INVENTION

The present invention therefore provides a radial block copolymer composition and a pressure-sensitive adhesive composition based thereon. The pressure-sensitive adhesive was found to exhibit excellent adhesive properties and convertibility. The adhesive provides the ability to achieve clean rupture of the adhesive layer in processing operations involving cutting through a face stock to the release liner of the laminate. At the same time the adhesive provides excellent adhesive properties at both ambient and reduced temperatures, in particular the adhesive has high shear performance thus increasing flexibility in formulation. The adhesive is particularly suitable for use in labels on both paper and synthetic substrates. The adhesive also has low melt viscosity and may be applied as a hot melt, at low temperature.

Accordingly the present invention provides a mixture of radial styrenic block copolymer and styrenic diblock copolymer comprising from 60 wt % to 10 wt % of radial styrenic block copolymer and from 40 wt % to 90 wt % of styrenic diblock copolymer.

In a preferred mixture the radial styrenic block copolymer consists of i) a polystyrene block segment and ii) a polyisoprene block segment having an end which comprises butadiene, wherein the block copolymer is characterised by the formula:

(pS-pI-pB)$_n$X pS being polystyrene, pI being polyisoprene, pB being polybutadiene, X being the residue of a multifunctional coupling agent used in the production of the radial block copolymer and n being a number greater than or equal to 3 and representing the average number of branches appended to X, and further wherein the pS component is present in an amount of at least 10 parts to about 35 parts per 100 parts by weight of the radial block copolymer; and the weight amount of polybutadiene in the pI-pB segment being less than 50 wt %. We prefer that n is predominantly 4.

We further prefer that the weight amount of polybutadiene in the pI-pB segment is less than 10 wt %.

The present invention further provides an adhesive system comprising a tackifier and a mixture of a radial styrenic block copolymer and a styrenic diblock copolymer comprising from 60 wt % to 10 wt % of the radial styrenic block copolymer and from 40 wt % to 90 wt % of the styrenic diblock copolymer.

The invention further provides the use in an adhesive of a mixture of a radial styrenic block copolymer and a styrenic diblock copolymer comprising from 60 wt % to 10 wt % of the radial styrenic block copolymer and from 40 wt % to 90 wt % of the styrenic diblock copolymer.

In a preferred embodiment the radial block copolymer is predominantly a four-arms radial block copolymer, is made by the process described in WO 95/14727 and has the properties described above in relation to the polymers of WO 95/14727. The process used to manufacture the four arms copolymers, as described above, generally results in the production of a small amount, typically no more than 10 wt %, of a three-arms radial copolymer.

In another preferred embodiment the radial block copolymer has a molecular weight (Mw) above 200,000 g/mole preferably above 240,000 g/mole. It is further preferred that the molecular weight be no greater than 500,000 g/mole, more preferably no greater than 400,000 g/mole. It is yet further preferred that the radial block copolymer be a four-arm copolymer of molecular weight from 240,000 g/mole to 500,000 g/mole, preferably to 400,000 g/mole, more preferably to 375,000 g/mole.

The use of the adhesive systems of the present invention has been found to enable improved die-cuttability in the production of labels. The invention therefore further provides the use of a mixture of a radial styrenic block copolymer and a styrenic diblock copolymer comprising 60 wt % to 10 wt % of the radial styrenic block copolymer and 40 wt % to 90 wt % of the styrenic diblock copolymer in label adhesives. Furthermore, we have found that the use of these copolymer mixtures provide adhesives with lower melt viscosity and higher shear resistance.

The invention further provides an adhesive composition providing improved die-cuttability performance when used as a hot melt label adhesive of a mixture of a tackifier and a mixture of a radial styrenic block copolymer and a styrenic diblock copolymer comprising 60 wt % to 10 wt % of the radial styrenic copolymer rubber and containing 40 wt % to 90 wt % of the styrenic diblock copolymer.

DETAILED DESCRIPTION OF THE INVENTION

The radial copolymers of the present invention are preferably composed of polystyrenic block segments, polydiene block segments, suitably polyisoprene block, or a predominantly polyisoprene block containing a relatively small amount of polybutadiene. Four arms radial copolymers are preferred.

The radial styrenic copolymers may be prepared by any suitable polymerisation technique such as living anionic polymerization. Such polymer synthesis is described in U.S. Pat. Nos. 5,292,819 and 5,399,627. Radial copolymers being the result of a coupling mechanism between two "living" prepolymers, do contain varying amount of diblocks. As a result such diblock molecular weight is identical to the molecular weight of each radial arm.

The block copolymer compositions of the present invention may be produced by controlling the coupling efficiency of the coupling reaction so that at least 40 wt % of the diblock material remains uncoupled, that is to say a coupling efficiency of less than 60%. This may be achieved by using the manufacturing techniques described in WO 95/14727 as for example by reducing the amount of coupling agent that is used. Alternatively the block copolymer compositions may be obtained by blending additional diblock material into the radial block copolymer (which may already contain some unreacted diblock material) to obtain a mixture containing the desired level of diblock material.

In the adhesives of the present invention the radial copolymer diblock copolymer mixture is preferably used as the only copolymer in the adhesive system. Alternatively however they may be mixed with other polymers, particularly other styrenic block copolymers such as diblock and triblock copolymers or mixtures thereof.

The block copolymers of the invention are preferably of styrene and isoprene. In order to get good die-cutting performance, the vinyl aromatic hydrocarbon content (generally styrene) of both the radial block copolymer and the diblock copolymer should be at least 10, preferably at least 11, more preferably at least 12, more preferably at least 13, more preferably at least 14, and more preferably at least 15% by weight. Similarly, the vinyl aromatic hydrocarbon content should be at or below 35, preferably at or below 34, preferably at or below 33, preferably at or below 32, preferably at or below 31, preferably at or below 30, preferably at or below 29, preferably at or below 28, preferably at or below 27, preferably at or below 26, preferably at or below 25, preferably at or below 24, preferably at or below 23, more preferably at or below 22, preferably at or below 21, preferably at or below 20, most preferably at or below 19% by weight. Preferred ranges for the vinyl aromatic hydrocarbon content may combine any upper and any lower limit described herein. Using polymers with this vinyl aromatic content results in a good combination of theological, die-cutting and adhesive performance. Lower levels of vinyl aromatics results in weak polymers, which impart poor shear properties, and higher levels give stiff adhesives, which are not sufficiently pressure sensitive.

Accordingly, the invention provides rubbers having the combination of structure and rheology that, inter alia, achieves a combination of good die-cutting and adhesive properties in systems which use pressure sensitive adhesives. The adhesives are preferably applied as hot melts. The preferred rubbers of the present invention have the following properties:

i) an overall minimum styrene content greater than 10, preferably 12, most preferably 15 wt %;
ii) an overall maximum styrene content of 35, preferably 27, more preferably 22 wt %;
iii) a maximum "pure" radial copolymer content of at most 60 wt %, preferably at most 55%, more preferably at most 50%, more preferably at most 45%, more preferably at most 40%, more preferably at most 35%, most preferably at most 30% based on the total amount of block copolymer present; and
iv) a minimum diblock copolymer content of at least 40 wt %, preferably at least 45 wt %, preferably at least 50 wt %, preferably at least 55 wt %, more preferably at least 60 wt %, most preferably at least 70 wt % based on the total amount of block copolymer present.

The radial copolymers of the present invention are preferably styrenic four arms.

Where the rubber contains block polymers in addition to those produced during the manufacture of the radial block copolymers, these are preferably styrene/isoprene block polymers, and it is preferred that the molecular weight of any added triblock material, particularly a SIS triblock material, is at least 50,000 g/mole, more preferably at least 100,000 g/mole, and at most 300,000 g/mole, particularly preferred is 150,000 to 200,000 g/mole. It is preferred that the molecular weight of any added diblock material, be at least 50,000 g/mole preferably at least 60,000 g/mole, more preferably 70,000 g/mole, most preferably at least 80,000 g/mole and at most 150,000 g/mole, preferably 140,000 g/mole, most preferably 110,000 g/mole. Where the styrene diblock material is a styrene-butadiene material, it is preferred that it has a molecular weight from 50,000 to 150,000 g/mole, preferably 65,000 to 130,000 g/mole, such as 65,000 to 110,000, most preferably 70,000 to 90,000 g/mole. In every embodiment the total diblock content must exceed 40 wt %. Preferred ranges for the molecular weights in this paragraph may combine any upper and any lower limited set out above.

For purposes of this specification, molecular weight means peak molecular weight as measured by Gel Permeation Chromatography (sometimes known as size exclusion chromatography) on a polystyrene calibration basis. Commercially available polystyrene standards were used for calibration and the molecular weights of copolymers were corrected according to Runyon et al, *J. Applied Polymer Science*, Vol. 13 Page 359 (1969) and Tung, L H *J. Applied Polymer Science*, Vol. 24 Page 953 (1979).

In the case of the preferred mixture of four arms radial copolymers and diblock copolymers, the molecular weight of the pure radial copolymers were calculated as 4 times the measured molecular weight of the diblock molecular weight i.e. calculated as four times the molecular weight of the diblock copolymer obtained during the polymerization reaction. The molecular weights of the radial copolymers quoted in this application therefore refer to the molecular weight of the pure radial copolymer.

A Hewlett-Packard Model 1090 chromatograph with a 1047A refractive index detector was used. The chromatograph was equipped with four 300 mm×7.5 mm Polymer Laboratories SEC columns packed with five micron particles. These consisted of two columns with $10^5$ angstrom pore size, one column with $10^4$ angstrom pore size, and one with mixed pore sizes. The carrier solvent was HPLC grade tetrahydrofuran (THF) with a flow of 1 ml/min. Column and detector temperatures were 40° C., and run time was 45 minutes.

Tackifier additives for use in the adhesives of this invention are chosen according to the nature of the particular rubber that is used. Most tackifiers may be used. Preferred tackifiers are resins from aliphatic petroleum derivative streams containing 5- or -6-carbon-atom dienes and mono-olefins. The tackifiers range from materials that are normally liquid at room temperature to those that are normally solid at room temperature. The resins typically contain 40 wt % or more of polymerized dienes. The dienes are typically piperylene and/or isoprene. Useful tackifiers include Escorez 1310 LC and Escorez 2520 manufactured by ExxonMobil Chemical, Piccotac 95 manufactured by Eastman Chemical, and the Wingtack resin family manufactured by Goodyear (with the numerical designation being the softening point) such as Wingtack 95, which is a solid resin having a softening point of about 95° C., and Wingtack 10, which is a liquid resin having a softening point of about 10° C.

Other suitable tackifiers include resins such as aliphatic/aromatic resins, which may or may not be hydrogenated such as the products ECR 373 having a softening point of about 90° C., or Escorez 2520 having a softening point of about 20° C. manufactured by ExxonMobil Chemical. Hydrogenated polycyclic resins (typically dicyclopentadiene resins such as Escorez 5300, 5320, 5340 and 5380 manufactured by ExxonMobil Chemical) and the like may also be used. Hydrogenated polycyclic aromatic modified resins, such as Escorez 5690, 5600 and 5620, manufactured by ExxonMobil Chemical, may also be used. Hydrogenated aromatic resins wherein a very substantial portion, if not all, of the benzene rings are converted to cyclohexane rings (for example, the Regalrez family of resins manufactured by Eastman Chemical such as Regalrez 1018, 1033, 1065, 1078 and 1126 and Regalite R-100, and the Arkon family of resins from Arakawa Chemical such as Arkon P-85, P-100, P-115 and P-125) may also be used.

Rosin, rosin esters, polyterpenes, and other tackifiers, which are compatible with the polyisoprene and polybutadiene phases and to some degree with the polystyrene end blocks, can also be added. All such tackifiers may be used in hydrogenated or unhydrogenated form. Other additives include plasticizing oils such as Shellflex 371, manufactured by Shell, Kaydol mineral oil, manufactured by Witco and Flexon 876 manufactured by ExxonMobil, which are soluble in both the polyisoprene and polybutadiene phases combine any upper and any lower limit. Typically the adhesives may contain from 5 to 20 wt %, preferably from 5 to 15 wt %, more preferably from 10 to 15 wt % of the plasticizing oil. Preferred ranges for the amount of plasticizing oil in this paragraph are set out above. Preferred ranges for the quantities set out in this paragraph may combine any upper and any lower limits set out above.

The tackifier may be present from 50% by weight, preferably from 55%, more preferably from 60%, based on the total weight of tackifier and copolymers. It may be present at up to 80% by weight, preferably up to 75%, more preferably up to 70% by weight. Conversely, the block copolymers are present from 20%, preferably from 25%, more preferably from 30%, by weight based on the weight of the tackifier and the copolymers and up to 50%, preferably up to 45%, by weight based on the combined weight of the tackifier system and the copolymers. The resin additives are preferably a mixture of a normally solid tackifier such as Escorez 1310 LC and a normally liquid tackifier such as Wingtack 10 or Escorez 2520. Preferred ranges for the quantities set out in this paragraph may combine any upper and any lower limits set out above.

Petroleum resins are well known and are generally produced by Friedel-Crafts or thermal polymerization of various feeds, which may be pure monomer feeds or refinery streams containing mixtures of various unsaturated materials. Generally speaking, the purer the feed the easier to polymerize. For example, pure styrene, pure α-methyl styrene and mixtures thereof are easier to polymerize than a $C_8/C_9$ refinery stream. Similarly, pure or concentrated piperylene is easier to polymerize than $C_4$ to $C_6$ refinery streams. But these pure monomers are more expensive to produce than the refinery streams that are often byproducts of large volume refining.

Aliphatic hydrocarbon resins can be prepared by cationic polymerization of a cracked petroleum feed containing $C_4$, $C_5$, and $C_6$ paraffins, olefins, and diolefins also referred to as "$C_5$ monomers". These monomer streams are comprised of cationically polymerisable monomers such as butadiene, 1,3-pentadiene (piperylene) along with cyclopentene, pentene, 2-methyl-2-butene, 2-methyl-2-pentene, isoprene, cyclopentadiene, and dicyclopentadiene. The refining streams are purified usually by both fractionation and impurity removal to obtain these feeds.

Polymerizations are catalyzed using Friedel-Crafts catalysts such as unsupported Lewis acids (for example, boron trifluoride ($BF_3$), complexes of boron trifluoride, aluminum trichloride ($AlCl_3$), or alkyl-aluminum halides, particularly chloride). In addition to the reactive components, non-polymerisable components in the feed include saturated hydrocarbons, which can be co-distilled with the unsaturated components such as pentane, cyclopentane, or 2-methylpentane. This monomer feed can be co-polymerized with other $C_4$ or $C_5$ olefins or dimers. The feed should be purified (typically by fractionation) to remove unsaturated materials that adversely affect the polymerization reaction or cause undesirable color of the final resin (for example, isoprene). Generally, $C_5$ aliphatic hydrocarbon resins are synthesized using a piperylene concentrate stream that is fractionation-enriched to increase the piperylene content and to reduce the difficult-to-polymerize, olefin and diolefin content.

Typically, the feed stream includes at least 20 wt %, preferably 30 wt %, more preferably 50 wt %, monomer and up to 80 wt %, preferably 70 wt %, more preferably 30 wt %, solvent. The solvent may be an aromatic solvent, such as toluene, xylenes, and aromatic petroleum solvents, or their mixtures. The solvent may include an aliphatic solvent. Mixtures of aromatic and aliphatic solvents may also be used. The solvent may also be recycled. The solvent may be a non-polymerisable feed component.

The feedstream may include at least $C_4$ to $C_6$ monomers, in which cyclopentadiene and methylcyclopentadiene components may be removed from the feed stream by heating at a temperature between 100° C. and 160° C. and fractionally distilling. The monomers may include at least one of isobutylene, butadiene, 2-methyl-2-butene, 1-pentene, 2-methyl-1-pentene, 2-methyl-2-pentene, 2-pentene, cyclopentene, isoprene, cyclohexene, 1,3-pentadiene, 1,4-pentadiene, isoprene, 1,3-hexadiene, 1,4-hexadiene, cyclopentadiene, and dicyclopentadiene.

In accordance with another aspect, the feed stream can include at least 30 wt %, preferably 50 wt %, of $C_5$ monomers, as described above and at least 5 wt %, preferably 15 wt % of a co-feed including at least one of pure monomer, $C_9$ monomers, and terpenes. Likewise, the feed stream can include up to 95 wt %, preferably 85 wt % of $C_5$ monomers, as described above and 70 wt %, preferably 50 wt %, of a co-feed including at least one of pure monomer, $C_9$ monomers, and terpenes.

The feed may also contain an aromatic olefin. Preferred aromatic olefins are those such as styrene, indene, and their derivatives. Particularly preferred aromatic olefins include styrene, α-methylstyrene, β-methylstyrene, indene, substituted indenes, such as methylindenes, and vinyl toluenes. The aromatic olefins are typically present at levels of at least 1 wt %, and at up to 50 wt %, more preferably 30 wt %, even more preferably 10 wt %.

Polymerizations may be continuous or batch processes. A batch process reaction time is usually at least 30 minutes, preferably 60 minutes, and no greater than 8 hours, preferably 4 hours at a reaction temperature. Polymerization temperatures range from −50° C. to 150° C., preferably −20° C. to 100° C. Temperature significantly affects resin properties. Higher-molecular-weight and high-softening-point resins are prepared at lower reaction temperatures. Polymerization may be stopped by removing the catalyst from the hydrocarbon resin, for example, by filtration. The hydrocarbon resin may be removed from a fixed bed reactor, which includes the catalyst. The hydrocarbon resin may be stripped to remove unreacted monomers, solvents, and low-molecular-weight oligomers. The unreacted monomers, solvents, and low-molecular-weight oligomers may be recycled.

The monomer feed can be co-polymerized with $C_4$ or $C_5$ olefin or dimers as chain transfer agents. Up to 40 wt % preferably up to 20 wt % of chain transfer agents may be added to obtain resins with lower molecular weight and narrower molecular weight distributions than can be prepared using the monomer feed alone. Chain transfer agents terminate polymer chain growth such that polymer initiation sites regenerate. Components that behave as chain transfer agents in these reactions include but are not limited to isobutylene, 2-methyl-1-butene, 2-methyl-2-butene, or dimers or oligomers of these species. The chain transfer agent can be added to the reaction in pure form or diluted in a solvent.

Preferred solvents are aromatic solvents—typically toluene, xylenes, or light aromatic petroleum solvents. These solvents can be used fresh or recycled from the process. The solvents generally contain less than 200 ppm water, preferably less than 100 ppm water, and most preferably less than 50 ppm water.

Typically, the resulting resin has a number average molecular weight (Mn) of at least 400, a weight average molecular weight (Mw) of at least 500, a Z average molecular weight (Mz) of at least 700, and a polydispersity (PD) as measured by Mw/Mn of at least 1.5 where Mn, Mw, and Mz are determined by Gel permeation chromatography. Similarly, the resin has a number average molecular weight (Mn) up to 2,000, a weight average molecular weight (Mw) of up to 3500, a Z average molecular weight (Mz) of up to 15,000 and a polydispersity (PD) as measured by Mw/Mn up to 4.

Where hydrogenated resins are used, the hydrogenation may be carried out via molten resin or resin solution-based processes by either batch wise or, more commonly, continuous processes. Supported monometallic and bimetallic catalysts based on group-6, -8, -9, -10 or -11 elements are typically used for hydrocarbon resin hydrogenation. Catalysts such as supported nickel (for example, nickel on alumina, nickel on charcoal, nickel on silica, nickel on kieselguhr, etc), supported palladium (for example, palladium on silica, palladium on charcoal, palladium on magnesium oxide, etc) and supported copper and/or zinc (for example, copper chromite on copper and/or manganese oxide, copper and zinc on alumina, etc.) are good hydrogenation catalysts. The support material typically consists of porous inorganic refractory oxides such as silica, magnesia, silica-magnesia, zirconia, silica-zirconia, titania, silica-titania, alumina, silica-alumina, alumina-silicate, etc, with supports containing γ-alumina being highly preferred. Preferably, the supports are essentially free of crystalline molecular sieve materials. Mixtures of the foregoing oxides are also contemplated, especially homogeneous mixtures. Among the useful support materials in the present invention are the supports disclosed in the U.S. Pat. Nos. 4,686,030, 4,846,961, 4,500,424, and 4,849,093. Preferred supports include alumina, silica, carbon, MgO, $TiO_2$, $ZrO_2$, $FeO_3$ or their mixtures.

Any of the known processes for catalytically hydrogenating hydrocarbon resins can be used; particularly the processes of U.S. Pat. Nos. 5,171,793, 4,629,766, 5,502,104 and 4,328,090 and WO 95/12623. Generic hydrogenation conditions include reaction temperatures of 100° C.-350° C. and hydrogen pressures of 5 atmospheres (506 kPa)-300 atmospheres (30390 kPa), for example, 10 to 275 atm (1013 kPa to 27579 kPa). A preferred hydrogenation temperature is in the range 180° C. to 320° C. and a preferred pressure is in the range 15195 kPa to 20260 kPa hydrogen. The hydrogen-to-feed volume ratio to the reactor under standard conditions (25° C., 1 atm (101 kPa) pressure) typically can range from 20-200. For water-white resins 100-200 is preferred.

Another suitable process for resin hydrogenation is described in EP 0082726. EP 0082726 describes hydrogenation of a catalytic or thermal petroleum resin using nickel-tungsten catalyst on a γ-alumina support where the hydrogen pressure is $1.47 \times 10^7$-$1.96 \times 10^7$ Pa and the temperature ranges from 250-330° C. Thermal hydrogenation is usually performed at 160° C. to 320° C., at a pressure of $9.8 \times 10^5$ to $11.7 \times 10^5$ Pa and for a period typically of 1.5 to 4 hours. After hydrogenation, the reactor mixture may be flashed and further separated to recover the resin. Steam distillation may be used to eliminate oligomers, preferably without exceeding 325° C.

In a particularly preferred embodiment, the catalyst comprises nickel and/or cobalt on one or more of molybdenum, tungsten, alumina or silica supports. In a preferred embodiment, the amount of nickel oxide and/or cobalt oxide on the support ranges from 2 to 10 wt %. The amount of tungsten or molybdenum oxide on the support after preparation ranges from 5 to 25 wt %. Preferably, the catalyst contains 4 to 7 wt % nickel oxide and 18 to 22 wt % tungsten oxide. This process and suitable catalysts are described in greater detail in U.S. Pat. No. 5,820,749.

In another preferred embodiment, the hydrogenation may be carried out using the process and catalysts described in U.S. Pat. No. 4,629,766. In particular, nickel-tungsten catalysts on γ-alumina are preferred.

While the pressure-sensitive adhesive formulations of the present invention exhibit excellent low temperature and ambient temperature performance as well as good die-cutting performance, they may also enhance elevated temperature performance. This may be accomplished by cross-linking techniques such as the use of electron beam (EB) radiation and ultraviolet (UV) radiation and chemical cross-linking. If employed, tackifying additives should be substantially saturated so that all of the energy of cure goes into cross-linking of the adhesives' elastomeric components.

The adhesive formulations may also contain additives well known in the art such as anti-block, anti-static, antioxidants, UV stabilizers, neutralizers, lubricants, surfactants, anti-nucleating agents and/or fillers. Preferred additives include silica, titanium dioxide, polydimethylsiloxane, talc, dyes, wax, calcium stearate, calcium carbonate, carbon black, barium sulphate and magnesium silicate.

The adhesives of the invention may be used as pressure sensitive adhesives, hot melt adhesives or contact adhesives and used in applications such as tapes, labels, paper impregnation, hot-melt adhesives, including woodworking, packaging, bookbinding or disposables, sealants, rubber compounds, pipe wrapping, carpet backing, contact adhesives, road-marking or tire construction. They are particularly useful as hot-melt pressure sensitive adhesives used for labels where they impart improved die-cutting performance, and also improved adhesive properties, particularly improved shear performance.

In the Examples which follow, the block copolymers used in the adhesive formulations were prepared by the process described in WO 95/14727 and the desired ratio of radial and diblock copolymers was obtained by varying the amount of coupling agent and/or by blending. The procedures for the preparation of the hot melt adhesive blends, and of the coatings as well as the testing of the adhesive performances were as follow.

The hot melt pressure sensitive adhesives were prepared by mixing the block copolymers with the tackifying resins in a laboratory z blade mixer of 300 ml capacity, at a temperature of about 145° C. A small amount of phenolic antioxidant was added to the blend to prevent its degradation during the blending process. The total mixing time was about 70 minutes.

The tackifiers used were Escorez 1310 and ECR 373 from ExxonMobil Chemical and Wingtack 10 from Goodyear.

Final blend viscosity was evaluated with a Brookfield viscosimeter according to a procedure based on ASTM D 3236-88.

The pressure sensitive adhesives were applied as a hot melt to a silicone coated paper at a coating weight of about 20 grams/sq meter, using an Acumeter laboratory coater with a slot die for extrusion of the molten adhesive at a temperature of 165° C. The lamination was done according to industry practice, by transfer coating from the silicone coater paper release substrate to an 80 g/sq meter vellum paper frontal substrate.

The adhesive performances were evaluated according to test methods published by FINAT, P.O. Box 85612 NL-2508 CH, The Hague, for example, FTM 1 for the peel adhesion at 180 degree
FTM 9 for the loop tack measurements
FTM 7 for the shear resistance Migration was evaluated by comparing the whiteness of the paper frontal substrate after ageing at 60° C. and 70° C. for one and two weeks. The whiteness was evaluated with a Hunterlab spectrophotometer.

Dynamic theological properties at 20° C. were determined on RDAII and SR-500 instruments manufactured by Rheometric Scientific, Piscataway, N.J. The former gives access to frequencies between $10^{-2}$ to 100 $rad.s^{-1}$ and temperatures lower than 20° C. (down to −70° C.) to reach the glassy region obtained at higher frequencies. The SR-500 instrument, which covers a frequency range between $10^{-5}$ to 100 $rad.s^{-1}$ at room temperature, was used for the terminal zone (lower frequencies). We used plate-plate geometry for all experiments. The diameter of the plate decreases from 25 mm to 5 mm as temperature decreases in order to maintain the actual rheometer torque between measurable limits. Frequency sweeps were carried out at deformation levels well within the linear viscoelastic region. In order to broaden the range of accessible experimental frequencies, time-temperature superposition was applied with care. Measurements in the range of frequencies $10^{-5}$ to $10^{+2}$ were made at 20° C. To reach higher frequencies experiments at lower temperature were performed and the measurements extrapolated to 20° C.

To ensure that experiments were conducted on bubble-free specimens, samples were degassed overnight under primary vacuum at about 90° C. Disks of adequate diameter were then compression molded, at a temperature systematically lower than the mixing temperature.

EXAMPLES

The following Examples A and B illustrate the Production of High Diblock/Radial Block copolymer Mixtures via control of coupling efficiency.

Example A

To a 5-gallon stirred reactor under a nitrogen atmosphere were added 12.5 kg of cyclohexane solvent and 84.0 g of a 0.17 M solution of sec-butyl lithium in cyclohexane. The temperature of the reactor was brought to 75° C. and 339 g of styrene was added. Polymerization of the styrene was allowed to continue for 36 minutes. The reaction mixture was cooled to 57° C. and 1692 g of isoprene was added. The isoprene was allowed to polymerize for 46 minutes, during which the reaction temperature reached a maximum of 92° C. At the end of the 46 minutes, 10 grams of butadiene was added at 71° C. and it was allowed to polymerize for an additional 34 minutes. Then 1.0 g of 0.87 M $SiCl_4$ in cyclohexane was added all at once. The reaction was allowed to continue for another 26 minutes before the reaction was terminated by addition of 3.0 ml of isopropanol.

The resulting polymer was analyzed by GPC, and found to contain 82.0% diblock and 18.0% coupled radial block polymer. The radial block copolymer had 84% four arms, 16% three arms and no detectable two arms material. The styrene content was 16.6 wt % and the molecular weight of the diblock was 78,150.

Example B

To a 5-gallon stirred reactor under a nitrogen atmosphere were added 12.5 kg of cyclohexane solvent and 79.1 g of a 0.17 M solution of sec-butyl lithium in cyclohexane. The temperature of the reactor was brought to 82° C. and 339 g of styrene was added. Polymerization of the styrene was allowed to continue for 37 minutes. The reaction mixture was cooled to 58° C. and 1692 g of isoprene was added. The isoprene was allowed to polymerize for 26 minutes, during which the reaction temperature reached a maximum of 95° C. At the end of the 26 minutes, 10 grams of butadiene was added at 71° C. and it was allowed to polymerize for an additional 43 minutes. Then 3.1 g of 0.87 M $SiCl_4$ in cyclohexane was added all at once. The reaction was allowed to continue for another 31 minutes before the reaction was terminated by addition of 3.0 ml of isopropanol.

The resulting polymer was analyzed by GPC, and found to contain 49.1% diblock, about 1% polystyrene homopolymer and the remainder coupled radial block polymer. The radial block copolymer had 78% four-arm and 15% three-arm, with the remainder two-arm materials. The styrene content was 16.6 wt % and the molecular weight of the diblock was 80,125.

The following additional Examples illustrate adhesive systems according to the present invention.

Styrene-isoprene four arms radial block copolymers having different contents of styrene-isoprene diblock copolymers and similar overall styrene content were used in a hot melt formulation containing 31 wt % total of block copolymer, 27 wt % of Wingtack 10, and 42 wt % of Escorez 1310 to which was added 0.4 wt % of Irganox 1076. The resulting hot melts show the following characteristics:

|  | Comparative Example 1 | Example 2 | Example 3 | Example 4 | Example 5 |
|---|---|---|---|---|---|
| Radial polymer molecular weight | 268000 | 290800 | 328000 | 332000 | 300000 |
| Diblock molecular weight | 67000 | 72700 | 82000 | 83000 | 75000 |
| Styrene content (wt %) | 20.5 | 17 | 18 | 17.8 | 17 |
| Diblock content (wt %) | 31 | 60 | 70 | 76 | 88 |
| Brookfield Viscosity (175° C. - mPa · s) | 6200 | 4960 | 5650 | 4460 | 1560 |
| 180° peel strength - N/25 mm |  |  |  |  |  |
| Room temperature - glass | 29 cf | 33.5 af | 34.1 pt | 36 | 29.5 cf |
| 3° C. - glass | 22 pt | 18 pt | 24 pt |  | 22.6 pt |
| Room temperature - PE | 20.5 af | 21 af | 27 cf + pt | 26 | 26 cf + pt |
| 3° C. - PE | 18.5 pt | 18.5 pt | 25 pt |  | 21 pt |
| Loop Tack - N |  |  |  |  |  |
| glass at room temperature | 23.5 af | 22 af | 28.3 af | 37 | 38 cf |
| glass at 3° C. | 15 pt | 6.5 af | 15 pt | 0.7 af | 17 pt |
| Loop Tack - N |  |  |  |  |  |
| Polyethylene at room temperature | 18 af | 14 af | 21.2 af | 24 af | 24 af |
| Polyethylene at 3° C. | 6.5 j | 16.5 j + pt | 5.0 j |  | 18 pt |
| Shear - room temperature - hours |  |  |  |  |  |
| Steel - 25 × 25 mm - 1 kg | >175 | 85-170 cf | >150 cf | 22-150 cf | 3 cf |
| Migration - % reflection |  |  |  |  |  |
| 1 week  60° C. | 90 | 88.5 | 86.9 | 89.5 | 87 |
| 2 weeks 60° C. | 87 | 84 | 84.2 | 89 | 87.5 |
| 1 week  70° C. | 82.5 | 85 | 83.8 | 82 | 80 |
| 2 weeks 70° C. | 80 | 77 | 80.6 | 68 | 79 |

-continued

| | Comparative Example 1 | Example 2 | Example 3 | Example 4 | Example 5 |
|---|---|---|---|---|---|
| Rheology | | | | | |
| Frequency where G' = 1000 Pa (rad/s) * | $1\ 10^{-1}$ | $1.7\ 10^{-1}$ | $1.1\ 10^{-1}$ | $1.7\ 10^{-1}$ | $3\ 10^{-1}$ |
| Tan delta at frequency where G' = 10,000 Pa * | 1.3 | 0.56 | 0.97 | 0.7 | 1.22 | pt means paper tear
cf means cohesive failure
af means adhesive failure
j means jerking
* when measured at 20° C.

FIG. 3 compares G' of comparative Example 1, a standard hot melt pressure sensitive based on pure triblock copolymer and an acrylic based adhesive.

The HMPSA adhesives of this invention have low viscosity, high shear properties for radials up to 80% diblock content, associated with excellent tack and peel performances at room and low temperature.

Figure 4:
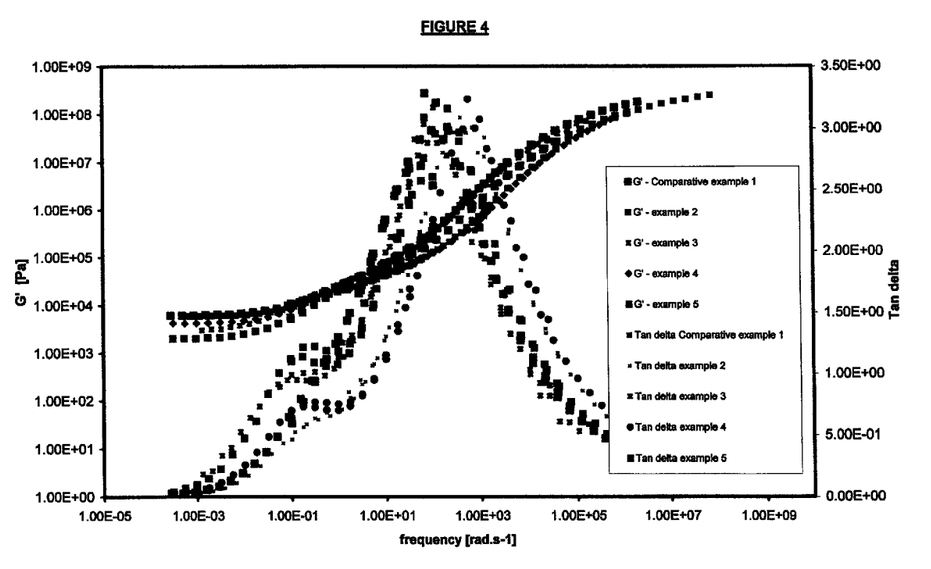
FIG. 4 shows the dynamic rheological properties, where they are compared with those of Comparative Example 1.

The dynamic rheological properties are shown in FIG. 4, where they are compared with those of Comparative Example 1. As it can be seen, the plateau modulus at low frequencies is decreasing when the level of diblock in the radial copolymer is increasing. The systems of the present invention have much lower moduli than the product of comparative Example 1.

G' intersects a value of 10000 Pa at frequencies higher than $10^{-3}$ rad/s.

At such frequencies Tan delta varies preferably from 0.35 to 1.22, preferably 0.56 to 1.22, when measured at 20° C.

The die-cutting performance of the adhesive of Example 4 was tested on a printing die-cutting machine, and was compared with a commercial Hot Melt Pressure Sensitive formulation based on linear block copolymers having an overall diblock content of 75% and with an acrylic based adhesive. The tests were performed using different types of die shapes. The results are shown in FIG. 5.

Figure 5:
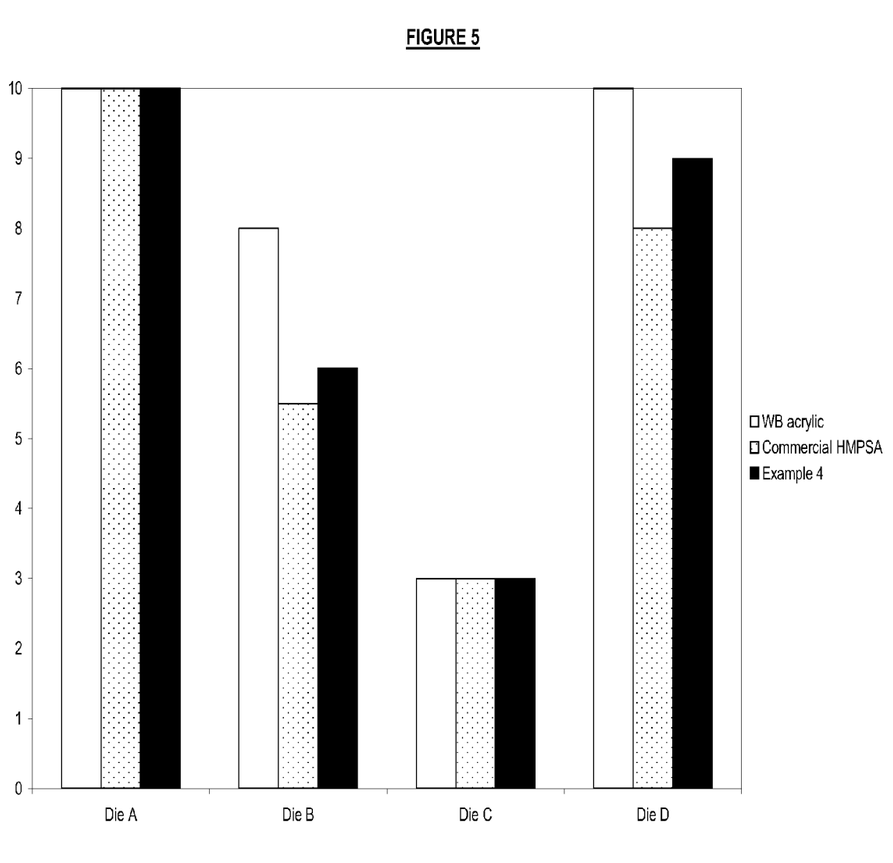
FIG. 5 shows the die-cutting performance of the adhesive of Example 4 as tested on a printing die cutting machine, and as compared with a commercial Hot Melt Pressure Sensitive formulation based on linear block copolymers having an overall diblock content of 75% and with an acrylic based adhesive.

The results shown in FIG. 5, demonstrate that the reduced elastic behavior as shown in FIG. 4 (lower plateau modulus, higher loss factor Tan delta) provide to hot melt pressure sensitive adhesives based on radial copolymer with high diblock content significantly better die-cutting performance than commercially available copolymer based adhesive formulations and is close to the die-cutting behavior of acrylic based adhesives.

We have also found that the radial block copolymer mixtures of the present invention have lower tensile strength and are softer and tackier than the previous mixtures with lower diblock content. This renders the polymers useful in applications such as sound deadening, shock absorption and polymer modification.

The invention claimed is:

1. A mixture of radial styrenic block copolymer and styrenic diblock copolymer comprising from 55 wt % to 10 wt % of radial styrenic block copolymer and from 45 wt % to 90 wt % of a styrene diene diblock copolymer and wherein the mixture has a styrene content of 10 wt % to 27 wt %; and wherein the radial styrenic block copolymer consists of i) a polystyrene block segment and ii) is a polyisoprene block segment having an end which comprises butadiene, wherein the block copolymer is characterized by the formula:

(pS-pI-pB)n X pS being polystyrene, pI being polyisoprene, pB being polybutadiene, X being the residue of a multifunctional coupling agent used in the production of the radial block copolymer and n being a number greater than or equal to 3 and representing the average number of branches appended to X, and further wherein the pS component is present in an amount of at least 10 parts to 35 parts per 100 parts by weight of the radial block copolymer; and wherein the weight amount of polybutadiene in the pI-pB segment is less than or equal to 5%.

2. A mixture according to claim 1 wherein the average number molecular weight (Mw) of the polystyrene component is between 10,000 and 15,000 g/mol.

3. A mixture according to claim 1 wherein n is predominately 4.

4. A mixture according to claim 1 in which the radial block copolymer has a molecular weight (Mw) from 200,000 to 500,000 g/mole.

5. A mixture according to claim 1 in which the styrenic radial copolymer has a molecular weight from 240,000 to 400,000 g/mole.

6. A mixture according to claim 1 in which the diblock copolymer is a styrene isoprene diblock copolymer.

7. A mixture according to claim 1 in which the diblock material is a styrene-butadiene diblock material of molecular weight from 50,000 to 150,000 g/mole.

8. An adhesive system comprising a tackifier and a mixture of radial styrenic block copolymer and styrenic diblock copolymer comprising from 55 wt % to 10 wt % of radial styrenic block copolymer and from 45 wt % to 90 wt % of a styrene diene diblock copolymer and wherein the mixture has a styrene content of 10 wt % to 27 wt %; and wherein the radial styrenic block copolymer consists of i) a polystyrene block segment and ii) is a polyisoprene block segment having an end which comprises butadiene, wherein the block copolymer is characterized by the formula:

(pS-pI-pB)n X pS being polystyrene, pI being polyisoprene, pB being polybutadiene, X being the residue of a multifunctional coupling agent used in the production of the radial block copolymer and n being a number greater than or equal to 3 and representing the average number of branches appended to X, and further wherein the pS component is present in an amount of at least 10 parts to 35 parts per 100 parts by weight of the radial block copolymer; and wherein the weight amount of polybutadiene in the pI-pB segment is less than or equal to 5%.

9. An adhesive according to claim 8 in which the radial block copolymer comprises a four-arm radial copolymer.

10. An adhesive according to claim 8 in which the radial block copolymer has a molecular weight (Mw) from 200,000 to 500,000 g/mole.

11. An adhesive according to claim 8 in which the diblock copolymer is a styrene isoprene diblock copolymer.

12. An adhesive according to claim 8 in which the styrenic radial copolymer has a molecular weight from 240,000 to 400,000 g/mole.

13. An adhesive according to claim 8 in which the diblock material is a styrene-butadiene diblock material of molecular weight from 50,000 to 150,000 g/mole.

14. An adhesive according to claim 8 in which the tackifier is at least one of a hydrocarbon resin, an aliphatic C5 resin, an aromatic resin, an aromatic/aliphatic C5/C6 resin.

15. An adhesive according to claim 14 in which the resin is hydrogenated.

16. An adhesive according to claim 8 in which the tackifier is a rosin, rosin ester, or a polyterpene resin.

17. An adhesive according to claim 16 in which the tackifier is hydrogenated.

18. An adhesive according to claim 8 having a storage modulus plateau at low frequencies below 8,000 Pa, when measured at 20° C.

19. An adhesive according to claim 8 in which G' intersects a value of 10,000 Pa at a frequency higher than 0.001 rad/s, when measured at 20° C.

20. An adhesive according to claim 8 having a loss factor Tan delta between 0.2 and 1.3 at the frequency at which the storage modulus intersects a value of 10000 Pa, when measured at 20° C.

21. An adhesive according to claim 8 further containing a plasticizing oil.

22. An adhesive according to claim 21 containing from 5 to 20 wt % of the plasticizing oil.

23. A hot melt pressure sensitive adhesive which is an adhesive according to claim 8.

24. A process for the production of labels comprising, applying as a hot melt an adhesive, according to claim 8, said adhesive being applied to a release liner, and subsequently laminating the coated release liner to a face stock, and converting the laminate into a label stock.

25. The mixture of claim 1 wherein the styrenic diblock copolymer content is at least 60 wt % based on the total amount of block copolymer present.

26. The mixture of claim 1 wherein the styrenic diblock copolymer content is at least 65 wt % based on the total amount of block copolymer present.

27. The mixture of claim 1 wherein the styrenic diblock copolymer content is at least 70 wt % based on the total amount of block copolymer present.

28. The adhesive of claim 8 wherein the styrenic diblock copolymer content is at least 60 wt % based on the total amount of block copolymer present.

29. The adhesive of claim 8 wherein the styrenic diblock copolymer content is at least 65 wt % based on the total amount of block copolymer present.

30. The adhesive of claim 8 wherein the styrenic diblock copolymer content is at least 70 wt % based on the total amount of block copolymer present.

* * * * *